J. KARSSEN.
SLEIGH RUNNER FOR VEHICLE WHEELS.
APPLICATION FILED MAR. 17, 1909.
933,463.
Patented Sept. 7, 1909.
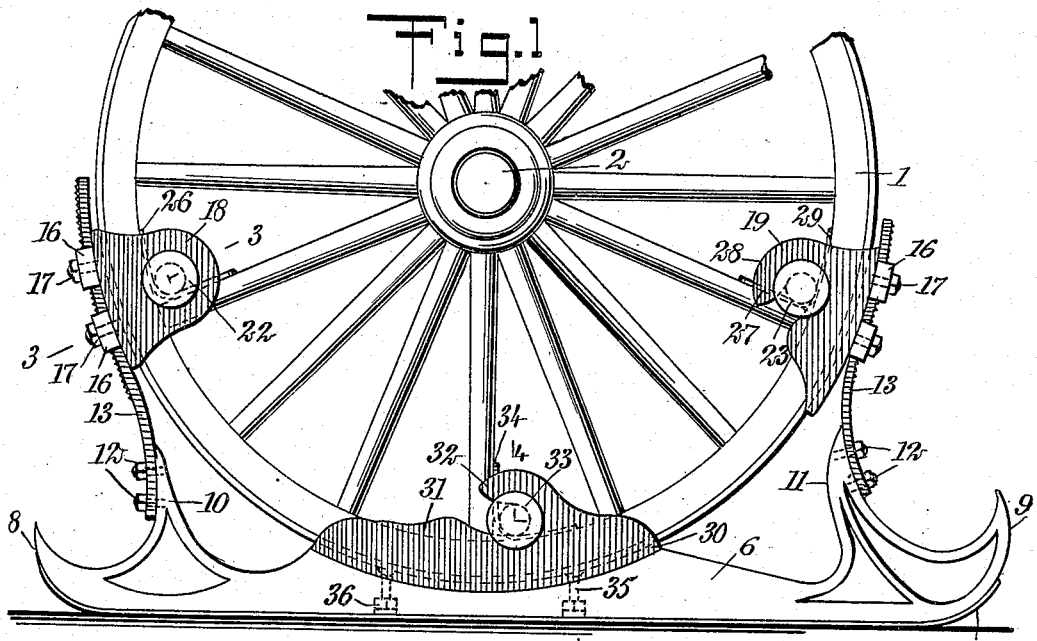
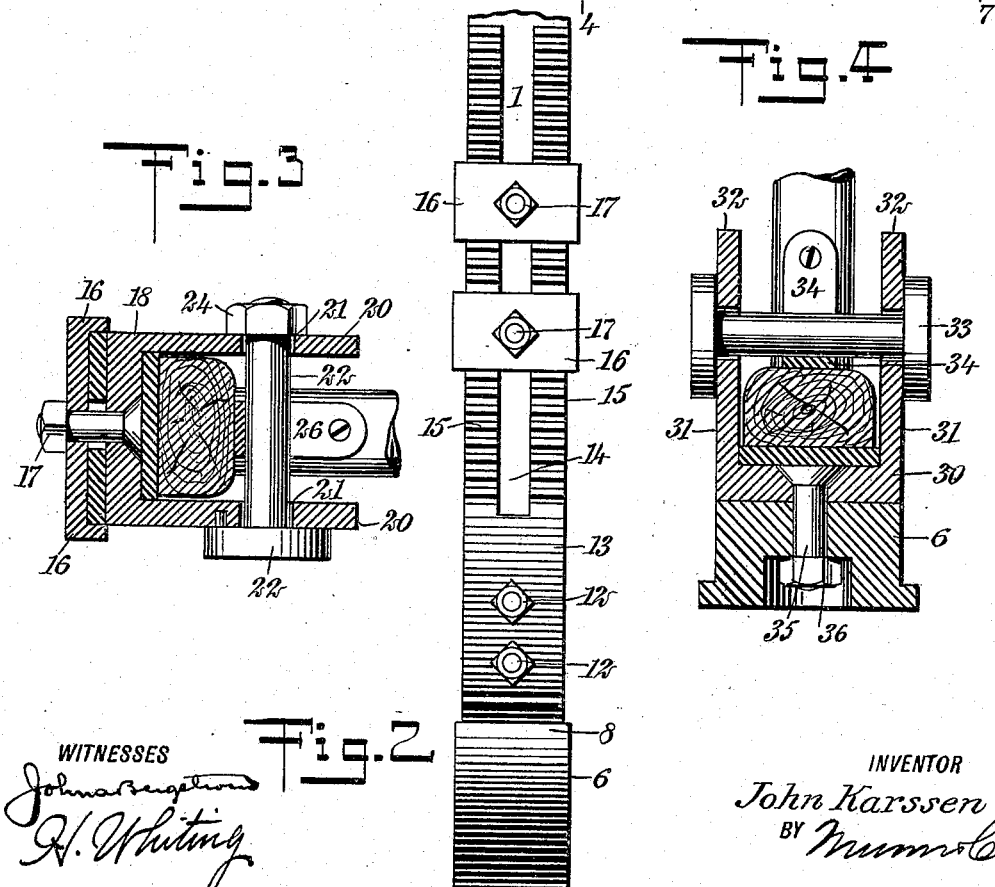
WITNESSES
INVENTOR
John Karssen
BY
ATTORNEYS

UNITED STATES PATENT OFFICE.

JOHN KARSSEN, OF HOLLAND, MICHIGAN.

SLEIGH-RUNNER FOR VEHICLE-WHEELS.

933,463.

Specification of Letters Patent.   Patented Sept. 7, 1909.

Application filed March 17, 1909. Serial No. 483,884.

*To all whom it may concern:*

Be it known that I, JOHN KARSSEN, a citizen of the United States, and a resident of Holland, in the county of Ottawa and State of Michigan, have invented a new and Improved Sleigh-Runner for Vehicle-Wheels, of which the following is a full, clear, and exact description.

This invention relates to sleigh runners adapted to be detachably fastened to the wheels of a vehicle.

This invention is an improvement on my Patent No. 910,206 granted to me January 19, 1909. The improvement which this invention is designed to make, is to render the attachment of the runner to the wheel adjustable, so as to fit wheels of various diameters and having various numbers of spokes.

Reference is to be had to the accompanying drawings forming a part of this specification, in which similar characters of reference indicate corresponding parts in all the views, and in which—

Figure 1 is an elevation showing my device attached to a wheel; Fig. 2 is a partial end view of the wheel, looking from the rear of the runner, some of the holding bolts hereinafter described, being omitted; Fig. 3 is a section on the line 3—3 of Fig. 1; and Fig. 4 is a section on the line 4—4 of Fig. 1.

Referring more particularly to the separate parts of the device, 1 indicates a wheel of a vehicle, which is supported on the axle 2 thereof.

6 designates the runner which is adapted to be attached to the wheel 1. This runner has a wear tire 7 suitably fastened to the bottom thereof, and has upturned ends 8 and 9 at each end thereof. These ends will be designated as the heel and toe. At the heel and toe of the runner are upwardly extending portions 10 and 11 to which are adapted to be fastened by any suitable means, such as the bolts 12, adjusting supports 13. These adjusting supports 13 are in the form of curved metal pieces having a slot 14 running three-quarters the length thereof. The flanges 15 formed by this slot 14 have on their outer surfaces, serrations which are adapted to be engaged by the clips 16. These clips 16 are fastened by any suitable means such as the bolts 17, which pass through the slot 14 in the supporting member, to the channel supports 18 and 19. These channel supports are adapted to receive the rim and tire of a wheel, and have flanges 20 thereon through which are openings 21 which are adapted to receive the fastening members 22 and 23. In the case of the channel member 18, the openings 21 therein are preferably wholly inclosed, that is, it is necessary that the fastening member 22 should be in the nature of a bolt so that it can be slid through the openings 21 and a removable fastener such as a nut 24 placed thereon. Between the rim of the wheel and the fastening members 22 and 23 is placed an angular bearing piece 26 which is adapted to be fastened to one of the spokes of the wheel, and to the rim. This bearing piece 26 takes up the wear incident to the jolts and jars of the runner. The channel member 19 differs somewhat from the channel member 18, having in place of a bolt, a double-headed pin 23 which is adapted to slide under hooks 27 in the flanges 28 of this channel member. This channel member also has a bearing piece 29 similar to that provided on the channel member 18, to engage the spoke and the rim of the wheel.

The base of the wheel 1 is supported indirectly on the runner 6 by means of the curved channel member 30. This channel member 30 is adapted to bear on the tire of the wheel 1 and has upwardly extending flanges 31 which engage the sides of the rim of the wheel. These flanges 31 have hook members 32 which are adapted to engage a double-headed pin 33 similar to that used on the channel member 19. This pin 33 also has a wear strip 34 similar to the wear strips used on the other channel members. The channel member 30 is secured to the runner 6 by means of bolts 35 which pass through openings in the base of the channel member 30 and in openings in the top of the runner 6. The runner 6 is channeled out on its under surface to form a concavity sufficient to manipulate nuts 36 on the bolts 35 and to prevent said bolts from scraping on the ground.

To place the runner on a wheel, the wearing or bearing strips are secured by any suitable means to the proper spokes, then the pins 23 and 33 are inserted on these wearing strips. The hooks on the flanges 19 and 30 are engaged over the pins 23 and 33 and within the heads thereon. The channel member 19 is adjusted by means of the clips 16 on the supporting strip 13, in such position that the runner 6 will rest evenly on the ground. The channel member 18 is then adjusted to the wheel 1 and raised to such a height on the supporting member 13 that it will bring it into working relation with the wearing strip 26. The bolts 17 are then tightened up, clamping the clips 16 tightly on the supporting members 13. The bolt 22 is then inserted through the openings in the flanges 20 and the nut 24 tightened thereon. If desired, the upper ends of the supporting members 13 which project above the flanges 18 and 19 may be removed after the runner has been once adjusted to the wheel on which it is to be used. The bolts 12 and 35 are removable so that the channel members 18, 19 and 30 may be first affixed to the wheel and then the runner attached if desired.

Having thus described my invention, I claim as new and desire to secure by Letters Patent:

1. In a device of the class described, the combination with a runner, of a curved channel member adapted to engage a vehicle wheel, means for removably fastening said channel member to the runner, a heel support removably attached to said runner, a channel member for said support, means for adjusting said channel member relatively to said support, a fastening device for holding said channel member to a wheel, and a wear strip for said fastening device.

2. In a device of the class described, the combination with a runner, of a channel member removably carried by said runner, flanges on said channel member adapted to engage the sides of the rim of a wheel, hooks on said flanges, pins adapted to engage said hooks, a wearing strip adapted to engage said pins and to support said pins on the rim of a vehicle wheel, heel and toe supports removably fastened to said runner, serrations on the surface of said supports, clips for engaging said serrations, bolts connected to said clips, channel members supported by said bolts, and means adapted to fasten said channel members to a wheel.

3. In a device of the class described, the combination with a runner, of a channel member on said runner adapted to engage a vehicle wheel, heel and toe supports carried by said runner, rim-engaging devices adjustable on said supports, and means for locking said rim-engaging devices to said supports.

4. In a device of the class described, the combination with a runner, of a curved channel member adapted to engage a vehicle wheel, means for removably fastening said channel member to the runner, a heel support removably attached to said runner, a channel member adjustable along said support, a fastening device for holding said channel member to a wheel, a wear-strip for said fastening device, and means for locking said channel member on said support in any adjusted position.

5. In a device of the class described, the combination with a runner, of a channel member secured to said runner and adapted to engage the sides of a wheel, heel and toe supports secured to said runner, said supports having longitudinal slots and serrated engaging surfaces, channel members adjustable along said support, and fastening devices for said channel members extending through said slots and adapted to secure said channel members in any adjusted position along said supports.

6. In a device of the class described, the combination with a runner, a bifurcated heel and toe supports on said runner, said heel and toe supports having serrated engaging surfaces, channel members adapted to be adjusted along said supports, and means for securing said channel members in any adjusted position on said supports.

7. In a device of the class described, the combination with a runner, of heel and toe supports, rim-engaging members slidably adjustable on said supports, and means for locking said rim-engaging members in any adjusted position.

In testimony whereof I have signed my name to this specification in the presence of two subscribing witnesses.

JOHN KARSSEN.

Witnesses:
  ISAAC MARSILJE,
  HENRY REIDSEMA.